United States Patent [19]

Williams et al.

[11] Patent Number: 5,407,967
[45] Date of Patent: Apr. 18, 1995

[54] METHODS AND COMPOSITIONS FOR PREPARING RIGID FORMS WITH NON-CHLOROFLUOROCARBON BLOWING AGENTS

[75] Inventors: Steve Williams; Warren Kaplan; Paul Neill; Gerardo Chapa, all of Grayslake, Ill.

[73] Assignee: Stepan Company, Northfield, Ill.

[21] Appl. No.: 238,388

[22] Filed: May 5, 1994

[51] Int. Cl.$^6$ .................. C08G 18/16; C08G 18/22; C08J 9/14
[52] U.S. Cl. .................. 521/130; 521/125; 521/172; 521/174
[58] Field of Search ............... 521/125, 130, 172, 174

[56] References Cited

U.S. PATENT DOCUMENTS

| | | | |
|---|---|---|---|
| 3,959,191 | 5/1976 | Kehr et al. | 521/129 |
| 4,767,796 | 8/1988 | Corteler et al. | 521/155 |
| 4,876,019 | 10/1989 | Meyer et al. | 521/51 |
| 5,008,033 | 4/1991 | Meyer et al. | 521/51 |
| 5,051,466 | 9/1991 | Meyer et al. | 521/107 |
| 5,164,143 | 11/1992 | Meyer et al. | 521/110 |
| 5,182,034 | 1/1993 | Meyer et al. | 54/51 |

*Primary Examiner*—Morton Foelak
*Attorney, Agent, or Firm*—Allegretti & Witcoff, Ltd.

[57] ABSTRACT

Disclosed are methods and compositions for preparing rigid foams by contacting a polyisocyanate with a polyol mixture comprising
(a) from about 40–95% by weight of a polyester or polyether polyol;
(b) a catalytic amount of a catalyst system comprising a primary catalyst and an amino acid salt catalyst derived from sarcosine; and
(c) a non-chlorofluorocarbon blowing agent.

10 Claims, No Drawings

METHODS AND COMPOSITIONS FOR PREPARING RIGID FORMS WITH NON-CHLOROFLUOROCARBON BLOWING AGENTS

BACKGROUND OF THE INVENTION

1. Field of the Invention

This invention is in the field of rigid foams and the method for production of such foams. More particularly it relates to spray foams and pour-in-place foams and the methods for preparing such foams.

2. Description of the Prior Art

Rigid foams have been employed for a variety of uses including, for example, insulating the roofs of buildings, as insulation for solid or liquid containing tanks, doors, water heaters, and picnic coolers.

Several fully halogenated hydrocarbons (chlorofluorocarbons, commonly referred to as CFC's) normally used as blowing agents for the preparation of rigid foams are believed to cause environmental problems. For instance, CFC-11 (trichlorofluoromethane) and CFC-12 (dichlorodifluoromethane) have been implicated in the deterioration of the stratospheric ozone layer. Thus, there has been much effort in research for developing alternative blowing agents that may (partly or wholly) replace the halogenated hydrocarbons as blowing agent in the standard foam formulations. The result is the use of a variety of non-chlorofluorocarbons (non-CFCs) as blowing agents.

When rigid foams have been prepared by reacting polyisocyanates with mixtures of polyols containing non-CFCs in the presence of trimerization catalysts such as potassium octanoate, the results in many instances have not produced rigid foams with properties as good as those blown with CFC's.

Among the problems associated with these reactions is an excessive amount of heat generated during the reaction of the polyol mixture with the polyisocyanate leading to relatively high pressures in the foam as the polymerization occurs. The high pressures are undesirable since they cause spray foam to "creep" as it cures. The high pressures also lead to the presence of "pinholes" in the exterior surface of the cured spray foam. Cured spray foams having pinholes cannot be treated with a coating.

In conventional pour-in-place rigid foams, the high pressure produced by the heat of the foam reaction after cure can create deformation of or within a molded part. Accordingly, there is a need for non-CFC blown foams that do not produce excessive pressures which result in creep and/or distortion of the foam.

DESCRIPTION OF THE INVENTION

The invention provides rigid spray and pour-in-place foams having improved parallel compressive strengths, i.e., parallel compressive strengths at least about 20% greater than in traditionally catalyzed rigid foam systems.

The rigid spray and pour-in-place foams of the invention have improved tensile strengths, i.e., parallel tensile strengths at least about 20% greater than in traditionally catalyzed rigid foam systems.

The invention further provides rigid spray foams having improved shear strengths i.e., parallel shear strengths at least about 20% greater than in traditionally catalyzed rigid foam systems.

The invention encompasses rigid foams substantially free from pinholes.

It further provides rigid foams that cure substantially free from creep and distortion.

Accordingly, the invention encompasses rigid foams having urea or urethane groups as the major recurring polymer unit, the polymers comprising the reaction product obtained by contacting a polyisocyanate with a polyol mixture comprising
  (a) from about 40–95% by weight of a polyester and-/or polyether polyol; and
  (b) a catalytic amount of a catalyst system comprising a primary catalyst and a secondary catalyst comprising an amino acid salt derived from sarcosine.

The invention also encompasses methods for preparing a rigid foam having urea or urethane groups as the major recurring polymer unit comprising contacting a polyisocyanate with a polyol mixture comprising
  (a) from about 40–95% by weight of a polyester or polyether polyol; and
  (b) a catalytic amount of a catalyst system comprising a primary catalyst and a secondary catalyst comprising an amino acid salt derived from sarcosine.

It further provides polyol mixtures comprising
  (a) from about 40–95% by weight of a polyester or polyether polyol;
  (b) a catalytic amount of a catalyst system comprising a primary catalyst and a secondary catalyst comprising an amino acid salt derived from sarcosine; and
  (c) a non-chlorofluorocarbon blowing agent.

In this document, all temperatures will be stated in degrees Celsius. All amounts, ratios, concentrations, proportions and the like will be stated in weight units, unless otherwise stated, except for ratios of solvents, which are in volume units.

By OH value is meant hydroxyl value, a quantitative measure of the concentration of hydroxyl groups, usually stated as mg KOH/g, i.e., the number of milligrams of potassium hydroxide equivalent to the hydroxyl groups in 1 g of substance.

By NCO/OH index is meant the molar ratio, multiplied by 100, of isocyanate groups to hydroxyl groups (including those contributed by water) in the reaction between the polyol blend and the polyisocyanate.

By functionality is meant the number of reactive groups, e.g., hydroxyl groups, in a chemical molecule.

In the foams and methods according to the invention, the polyol mixture comprises from about 45–80%, preferably from about 45–55%, by weight of a polyester polyol. The polyol mixtures of the invention may further comprise a polyether polyol. Typical polyol mixtures comprise from about 40–80%, preferably from about 45–55%, by weight of a polyether polyol.

By non-chlorofluorocarbon (non-CFC) blowing agent is meant any blowing agent capable of being employed in methods for preparing rigid foams that is not completely substituted by a mixture of chlorine and fluorine. I.e., perfluorinated hydrocarbons such as perfluoropentane are acceptable non-CFC's. Representative CFC's are, for example, trichlorofluoromethane (CFC-11) and dichlorodifluoromethane (CFC-12).

The polyisocyanate starting components used according to the present invention include aliphatic, cycloaliphatic, araliphatic, aromatic and heterocyclic polyisocyanates, such as those described, for example, by W. Siefken in Justus Liebigs Annalen der Chemie 562: 75–136. Examples include ethylene diisocyanate;

tetramethylene-1,4-diisocyanate, hexamethylene-1,6-diisocyanate; dodecane-1,12-diisocyanate; cyclobutane-1,3-diisocyanate; cyclohexane-1,3- and 1,4-diisocyanate and mixtures of these isomers; 1-isocyanato-3,3,5-trimethyl-5-isocyanatomethylcyclohexane (German Auslegeschrift No. 1,202,785, U.S. Pat. No. 3,401,190); hexahydrotolylene-2,4- and 2,6-diisocyanate and mixtures of these isomers; hexahydrophenylene-1,3- and/or -1,4-diisocyanate; perhydrodiphenylmethane-2,4'- and/or 4,4'-diisocyanate; phenylene-1,3- and -1,4-diisocyanate; tolylene-2,4- and -2,6-diisocyanate and mixtures of these isomers; diphenylmethane-2,4'- and/or -4,4'-diisocyanate; naphthylene-1,5-diisocyanate; triphenyl methane-4,4', 4"-triisocyanate; polyphenyl-polymethylene polyisocyanate which may be obtained by aniline/formaldehyde condensation followed by phosgenation and which have been described, for example, in British Pat. Nos. 874,430 and 848,671; m- and p-isocyanatophenyl sulphonyl isocyanate according to U.S. Pat. No. 3,454,606; perchlorinated aryl polyisocyanate as described, for example, in U.S. Pat. No. 3,277,138; polyisocyanate; containing carbodiimide groups as described in U.S. Pat. No. 3,152,162; the diisocyanates described in U.S. Pat. No. 3,492,330; polyisocyanates containing allophanate groups as described, for example, in British Pat. No. 994,890, Belgian Pat. No. 761,626 and Published Dutch Patent application No. 7,102,524; polyisocyanates containing isocyanurate groups as described, for example, in U.S. Pat. No. 3,001,973, in German Pat. Nos. 1,022,789; 1,222,067 and 1,027,394 and in German Offenlegungsschriften Nos. 1,929,034 and 2,004,048; polyisocyanates containing urethane groups as described, for example, in Belgian Pat. No. 752,261 or in U.S. Pat. No. 3,394,164; polyisocyanates containing acrylated urea groups according to German Pat. No. 1,230,778; polyisocyanates containing biuret groups as described, for example, in U.S. Pat. Nos. 3,124,605 and 3,201,372; and in British Pat. No. 889,050; polyisocyanates prepared by telomerization reactions as described, for example in U.S. Pat. No. 3,654,016; polyisocyanates containing ester groups as mentioned, for example, in British Pat. Nos. 965,474 and 1,072,956, in U.S. Pat. No. 3,567,763 and in German Pat. No. 1,231,688; reaction products of the above-mentioned isocyanates with acetals according to German Pat. No. 1,072,385; and, polyisocyanates containing polymeric fatty acid groups as described in U.S. Pat. No. 3,455,883.

The distillation residues obtained from the commercial production of isocyanates and which still contain isocyanate groups may also be used, optionally dissolved in one or more of the above-mentioned polyisocyanates. Mixtures of the above-mentioned polyisocyanates may also be used.

The polyisocyanates which are readily available are generally preferred, for example, toluene-2,4- and -2,6-diisocyanate and mixtures of these isomers ("TDI"); polyphenyl polymethylene polyisocyanates which may be obtained by aniline/formaldehyde condensation followed by phosgenation ("crude MDI"); and, polyisocyanates containing carbodiimide groups, urethane groups, allophanate groups, isocyanurate groups, urea groups or biuret groups ("modified polyisocyanates").

A presently preferred polyisocyanate is methylene bis(phenyl isocyanate).

In a typical rigid spray foam application, the polyisocyanate mixture is reacted with a polyol blend at from about a 0.85:1 to 3:1 (v/v) ratio. A preferred ratio of polyisocyante to polyol blend is 1:1 (v/v). The NCO-/OH index in reactions according to the invention is less than about 249, preferably from about 150 to 225, and more preferably from about 190 to 210. The reaction can be achieved using a spray gun apparatus or other suitable mixing devices.

Starting polyol components used in the polyol blends or mixtures according to the present invention include polyesters containing at least two hydroxyl groups, as a rule having a molecular weight of from 300 to 10,000, in particular polyesters containing from 2 to 8 hydroxyl groups, preferably those having a molecular weight of from 350 to 700, more preferably from 350 to 600, wherein the acid component of these polyesters comprise at least 50%, by weight, preferably at least 70%, by weight, of phthalic acid residues.

These polyesters containing hydroxyl groups include for example, reaction products of polyhydric, preferably dihydric and optionally trihydric, alcohols with phthalic acids and other polybasic, preferably dibasic, carboxylic acids. Instead of using the free phthalic acids or polycarboxylic acids, the corresponding acid anhydrides or corresponding acid esters of lower alcohols or mixtures thereof may be used for preparing the polyesters. Orthophthalic acids, isophthalic acids and/or terephthalic acids may be used as the phthalic acid. The optional polybasic-carboxylic acids may be aliphatic, cycloaliphatic, aromatic and/or heterocyclic and may be substituted, for example, with halogen atoms and/or may be unsaturated. The following are mentioned as examples; succinic acid, adipic acid, suberic acid, azelaic acid, sebacic acid, trimellitic acid, tetrahydrophthalic acid anhydride, hexahydrophthalic acid anhydride, endomethylene tetrahydro phthalic acid anhydride, glutaric acid anhydride, maleic acid, maleic acid anhydride, fumaric acid, dimeric and trimeric fatty acids, such as oleic acid, optionally mixed with monomeric fatty acids. Suitable polyhydric alcohols include, for example, ethylene glycol, propylene glycol-(1,2) and -(1,3), diol-(1,8), neopentyl glycol, cyclohexane dimethanol (1,4-bis-hydroxymethylcyclohexane), 2-methyl-1,3-propane diol, glycerol, trimethylolpropane, hexanetriol-(1,2,6) butane triol-(1,2,4), trimethylolethane, pentaerythritol, quinitol, mannitol and sorbitol, methylglycoside, also diethylene glycol, triethylene glycol, tetrathylene glycol, polyethylene glycols, dibutylene glycol, and polybutylene glycols. The polyesters may also contain carboxyl end groups. Polyesters of lactones, such as $\delta$-caprolactone, or hydroxycarboxylic acids, such as $\omega$-hydroxycaproic acid, may also be used.

According to the present invention, polyethers containing at least one, generally from 2 to 8, preferably 3 to 6, hydroxyl groups and having a molecular weight of from 100 to 10,000 of known type may be used in the polyol blend. These are prepared, for example, by the polymerization of epoxides, such as ethylene oxide, propylene oxide, butylene oxide, tetrahydrofuran, styrene oxide, or epichlorohydrin, either on its own for example in the presence of $BF_3$, or by chemical addition of these epoxides, optionally as mixtures or successively, to starting components having reactive hydrogen atoms, such as alcohols or amines, for example water, ethylene glycol, propylene glycol-(1,3) or -(1,2), trimethylol propane, 4,4-dihydroxy diphenylpropane aniline, ammonia ethanolamine or ethylene diamine. Sucrose polyethers which have been described, for example in German Auslgeschrift Nos. 1,176,358 and 1,064,938 may also be used according to the present invention.

Among the corresponding polythioethers which may also be used are the condensation products obtained from thiodiglycol on its own and/or with other glycols, dicarboxylic acids, formaldehyde, aminocarboxylic acids or aminoalcohols should be particularly mentioned. The products obtained are polythio mixed ethers, polythio ether esters or polythio ether ester amides, depending on the co-components.

Polyhydroxyl compounds already containing urethane or urea groups and modified or unmodified natural polyols, such as castor oil, carbohydrates or starch may also be used. Addition products of alkylene oxides and phenyl/formaldehyde resins or of alkylene oxides and urea/formaldehyde resins are also suitable according to the present invention.

Representatives of these compounds which may be used according to the present invention have been described, for example, in High Polymers, Volume XVI, "Polyurethanes, Chemistry and Technology", by Saunders and Frisch, Interscience Publishers, New York; London, Volume I, 1962, pages 32–42 and pages 44 to 54 and Volume II, 1964, pages 5 and 6 and 198–199, and in Kunststoff-Handbuch, Volume VII, Vieweg-Hochtlen, Carl-Hanser-Verlag, Munich, 1966, for example, on pages 45 to 71.

The methods and compositions of the invention are applicable to preparing rigid foams using a variety of non-CFC blowing agents. Suitable blowing agents include, but are not limited to, halogenated hydrocarbons such as, for example, 2,2-dichloro-2-fluoroethane (CFC-141b), water, and hydrocarbons such as pentane. Other suitable organic blowing agents include, for example, acetone, ethyl acetate, halogenated alkanes, such as methylene chloride, chloroform, ethylidene chloride, vinylidene chloride, and also butane, hexane, heptane or diethylether. The effect of a blowing agent may also be obtained by adding compounds which decompose at temperatures above room temperature to liberate gases, such as nitrogen, for example, azo compounds, such as azoisobutyric acid nitrile. Other examples of blowing agents and details about the use of blowing agents may be found in Kunststoff-Handbuch, Volume VII, published by Vieweg-Hochtlen, Carl-Hanser-Verlag, Munich, 1966, for example, on pages 108 and 109, 453 to 455 and 507–510.

Compounds which readily initiate a polymerization reaction of the NCO-groups at temperatures as low as room temperature are used as the primary catalyst system for polymerization. Compounds of this type are described, for example, in French Pat. No. 1,441,565, Belgian Pat. Nos. 723,153 and 723,152 and German Pat. No. 1,112,285.

Such catalyst systems are, in particular, mononuclear or polynuclear Mannich bases of condensable phenols, oxo-compounds and secondary amines which are optionally substituted with alkyl groups, aryl groups or aralkyl groups, preferably those in which formaldehyde is used as the oxo-compound and dimethylamine as the secondary amine. More or less large proportions of carbodiimide structures generally occur in the forms, as shown by IR spectroscopy, depending on conditions, especially the reaction temperature attained.

Other suitable primary catalysts are the salts of the alkali metals or alkaline earth metals of carboxylic acids and phenols, such as, for example, potassium octoate. The quantity of the primary polymerization catalyst is essentially determined by the type (and if necessary the basicity) of the catalyst; i.e., from 0.1 to 100%, by weight, preferably from 0.3 to 29%, by weight, of catalyst in relation to the isocyanate may be used.

According to the present invention, the conventional catalysts that may be used as the primary catalyst for the polyurethane reaction include, for example, tertiary amines, such as triethylamine, tributylamine, N-methyl morpholine, N-ethylmorpholine, N-cocomorpholine, N,N,N', N'-tetramethylethylenediamine, 1,4-diazabicyclo-(2,2,2)-octane, N-methyl-N'-dimethyl aminoethylpiperazine, N,N-dimethylbenzylamine, bis-(N,N-diethylaminoethyl)adipate, N,N-diethylbenzylamine, pentamethyldiethylenetriamine, N,N-dimethylcyclohexylamine, N,N,N', N'-tetramethyl-1,3-butanediamine, N,N-dimethyl-$\beta$-phenylethylamine, 1,2-dimethylimidazole and 2-methylimidazole.

Tertiary amines containing isocyanate-reactive hydrogen atoms used as primary catalysts include, for example, triethanolamine, triisopropanolamine, N-methyl-diethanolamine, N-ethyl-diethanolamine, N,N-dimethylethanolamine and the reaction products thereof with alkylene oxides, such as propylene oxide and/or ethylene oxide.

Silaamines having carbon-silicon bonds as described, for example, in German Pat. No. 1,229,290 (corresponding to U.S. Pat. No. 3,620,984) may also be used as catalysts, for example, 2,2,4-trimethyl-2-silamorpholine and 1,3-diethylaminomethyl-tetramethyldisiloxane.

The primary catalysts used may also be basic nitrogen compounds, such as tetralkylammonium hydroxides, alkali metal hydroxides, such as sodium hydroxide, alkali metal phenolates, such as sodium phenolate, or alkali metal alcholates, such as sodium methylate. Hexahydrotriazines may also be used as catalysts. Any of the primary catalysts derived from amines may be used in the invention as the corresponding ammonium salts or quaternary ammonium salts.

According to the present invention, organic metal compounds, in particular organic tin compounds, may also be used as catalysts.

Suitable organic tin compounds are preferably tin(II)-salts of carboxylic acids, such as tin(II)-acetate, tin(II)-octoate, tin(II)-ethylhexoate and tin(II)-laurate, and the tin(IV)-compounds, for example dibutyl tin oxide, dibutyl tin dichloride, dibutyl tin diacetate, dibutyl tin dilaurate, dibutyl tin maleate or dioctyl tin diacetate.

Suitable organo lead compounds for use as primary catalysts include lead naphthanate and lead octoate.

All of the above-mentioned primary catalysts may be used as mixtures.

Further representatives of primary catalysts which may be used according to the present invention, as well as details on the mode of operation of the catalyst are described in Kunststoff-Handbuch, Volume III, published by Vieweg-Hochtlen, Carl-Hanser-Verlag, Munich, 1966, for example, on pages 96 to 102.

Presently preferred primary catalysts include N,N-dimethylcyclohexylamine, lead naphthanate, tin octanoate and tin dilaurate.

The primary catalysts are generally used in a quantity of from about 0.001 to 10%, by weight, based on the quantity of the polyesters used according to this invention.

According to the present invention, surface-active additives, such as emulsifiers and foam stabilizers, may also be used. Suitable emulsifiers include, for example, the sodium salts of ricinoleic sulphonates, or salts of fatty acids and amines, such as oleic acid diethylamine or stearic acid diethanolamine. Alkali metal or ammonium salts of sulphonic acids, such as dodecyl benzene sulphonic acid or dinaphthylmethane; disulphonic acid or of fatty acids, such as ricinoleic acid, or of polymeric fatty acids may also be used as surface-active additives.

The foam stabilizers used are mainly polyether siloxanes, especially those which are water-soluble. These compounds generally have a polydimethyl siloxane group attached to a copolymer of ethylene oxide and propylene oxide. Foam stabilizers of this type have been described, for example, in U.S. Pat. Nos. 2,834,748; 2,917,480 and 3,629,308.

According to the present invention, it is also possible to use known cell regulators such as paraffins or fatty alcohols or dimethyl polysiloxanes, as well as pigments or dyes and known flame-proofing agents, for example, trischloroethylphosphate, tricresylphosphate or ammonium phosphate or polyphosphate, also stabilizers against aging and weathering, plasticizers, fungistatic and bacteriostatic substances and fillers, such as barium sulphate, kieslguhr, carbon black or whiting.

Other examples of surface-active additives, foam stabilizers, cell regulators, reaction retarders, stabilizers, flame-proofing substances, plasticizers, dyes, fillers and fungistatic and bacteriostatic substances which may also be used according to the present invention and details concerning the use and action of these additives may be found in Kunststoff-Handbuch, Volume VII, published by Vieweg and Hochtlen, Carl-Hanser-Verlag, Munich 1966, for example on pages 103 and 113.

The secondary catalysts, i.e., amino acid salt catalysts, suitable for use in the invention include those derived from sarcosine. Suitable amino salts derived from sarcosine include various N-(2-hydroxy or 2-alkoxy-5-alkylphenyl)alkyl sarcosinates. The alkyl groups are independently $C_1-C_{18}$ alkyl groups and the alkoxy groups are $C_1-C_6$ alkoxy groups. Of course, each of the sarcosinate derivatives includes a suitable counterion, such as, for example, sodium, potassium, magnesium, lithium, etc. A presently preferred amino acid salt is sodium N-(2-hydroxy-5-nonylphenyl)methyl sarcosinate. Each of the amino acid derivatives may be prepared according to the procedures set forth in U.S. Pat. No. 3,903,018. Representative amino acid salt catalysts are, for example, sodium N-(2-hydroxy-5-methylphenyl)methyl sarcosinate;
sodium N-(2-hydroxy-5-ethylphenyl)methyl sarcosinate;
sodium N-(2-hydroxy-5-butylphenyl)methyl sarcosinate;
sodium N-(2-hydroxy-5-heptylphenyl)methyl sarcosinate;
sodium N-(2-hydroxy-5-nonylphenyl)methyl sarcosinate;
sodium N-(2-hydroxy-5-dodecylphenyl)methyl sarcosinate;
potassium N-(2-hydroxy-5-nonylphenyl)methyl sarcosinate;
lithium N-(2-hydroxy-5-nonylphenyl)methyl sarcosinate; and mixtures thereof. Other suitable secondary catalysts include, for example, the disodium salt of 2,6-bis-(N-carboxymethyl-N-methylaminomethyl)-p-ethylphenol and the disodium salt of 2,6-bis-(N-carboxymethyl-N-methylaminomethyl)-p-nonylphenol; and mixtures thereof.

The amino acid salt catalyst is typically employed in the polyol blend or mixture in amounts of from about 0.1 to about 5.0 percent, and preferably from about 0.75 to about 2.0 percent, based on the total polyol composition. At least an effective or catalytic amount of the amino acid salt should be present. By an "effective amount" or catalytic amount is meant a sufficient quantity to permit cure of the foam. A cured spray foam has a compressive strength of at least about 15 lbs./in$^2$. within about 5 minutes after the foam is sprayed. A cured pour-in-place foam can be demolded without distortion within about 5 minutes of filling the mold.

The compositions prepared according to the invention for use in spray applications may be applied with spray guns such as, for example, a "D" spray gun, a Probler Air-Purge spray gun, or a Gusmer Corp. GX-7 spray gun in the standard setup. Suitable metering devices for use with spray guns include, for example, the Gusmer H2, H3, H2000 and VR 3000, and the Grayco Foamcap 400 series metering machines.

The foams obtained in accordance with the present invention may be used, for example, as insulating materials, in the construction industry, the commercial sector, as constructional materials, or the recreational industry as well as in the furniture industry. Examples of uses for foams prepared according to the invention include doors, water heaters, picnic coolers, etc.

All documents, e.g., patents and journal articles, cited above or below are hereby incorporated by reference in their entirety.

One skilled in the art will recognize that modifications may be made in the present invention without deviating from the spirit or scope of the invention. The invention is illustrated further by the following examples which are not to be construed as limiting the invention or scope of the specific procedures described herein.

EXAMPLE 1

Polyol mixtures for preparing spray foams are prepared by first adding the polyester polyol to a suitable reaction vessel. After initiating mixing, the polyether polyol, tris(chloropropyl)phosphate, epoxy resin, surfactant, water, lead naphthanate, and catalysts are added in order. The reaction vessel is then sealed. To the vessel is then added the blowing agent, 2,2-dichloro-2-fluoroethane, while maintaining the temperature of the mixture at about 20° C. The mixture is then mixed for about 45 minutes, and can be stored or immediately used to prepare a rigid foam.

| | Polyol Formulation | | | | | |
|---|---|---|---|---|---|---|
| | 1 | | 2 | | 3 | |
| Component | pbw[1] | %[2] | pbw | % | pbw | % |
| PS 2352[3] | 72.6 | 50.93 | 72.4 | 50.52 | 72.6 | 49.93 |
| R-470X[4] | 27.4 | 19.22 | 27.4 | 19.07 | 27.4 | 18.84 |
| AKZO PCF[5] | 10.68 | 7.49 | 10.68 | 7.43 | 10.68 | 7.35 |
| epoxy resin[6] | 0.55 | 0.39 | 0.55 | 0.38 | 6.85 | 0.38 |
| L-6701[7] | 2.74 | 1.92 | 2.74 | 1.91 | 2.74 | 1.88 |
| lead naphthanate | 0.35 | 0.25 | 1.50 | 1.04 | 1.20 | 0.83 |
| sarcosine derivative[8] | 3.00 | 2.10 | 3.00 | 2.09 | 5.00 | 3.44 |
| polycat-8[9] | 0.5 | 0.35 | 0.50 | 0.35 | 0.50 | 0.34 |
| water | 0.23 | 0.16 | 0.23 | 0.16 | 0.23 | 0.16 |
| HCFC-141b[10] | 24.5 | 17.19 | 24.5 | 17.05 | 24.50 | 16.85 |
| | Polyol Formulation | | | | | |
| | 4 | | 5 | | 6 | |
| Component | pbw | % | pbw | % | pbw | % |
| PS 2352 | 72.6 | 49.66 | 72.6 | 49.49 | 72.6 | 49.79 |
| R-470X | 27.4 | 18.74 | 27.4 | 18.68 | 27.4 | 18.79 |
| AKZO PCF | 10.63 | 7.31 | 0.68 | 7.28 | 10.68 | 7.32 |

-continued

| | | | | | | |
|---|---|---|---|---|---|---|
| Epoxy resin | 0.55 | 0.38 | 0.55 | 0.37 | 0.55 | 0.38 |
| L-6701 | 27.74 | 1.87 | 2.74 | 1.87 | 1.35 | 0.93 |
| lead naphthanate | 2.00 | 1.37 | 1.50 | 1.02 | 3.00 | 2.06 |
| sarcosine derivative | 5.00 | 3.42 | 5.00 | 3.41 | 5.00 | 3.43 |
| potassium octoate | — | — | 1.00 | 0.70 | — | — |
| polycat-8 | 0.50 | 0.34 | 0.50 | 0.34 | 0.50 | 0.34 |
| water | 0.23 | 0.16 | 0.23 | 0.16 | 0.23 | 0.16 |
| HCFC-141b | 24.50 | 16.77 | 24.50 | 16.70 | 24.50 | 16.80 |

| | Polyol Formulation | | | | | |
|---|---|---|---|---|---|---|
| | 7 | | 8 | | 9 | |
| Component | pbw | % | pbw | % | pbw | % |
| PS 2352 | 72.6 | 49.62 | 72.6 | 49.15 | 72.6 | 49.15 |
| R-470X | 27.4 | 18.73 | 27.4 | 18.55 | 27.4 | 18.55 |
| AKZO PCF | 10.68 | 7.30 | 10.68 | 7.23 | 10.68 | 7.23 |
| Epoxy resin | 0.55 | 0.38 | 0.55 | 0.37 | 0.55 | 0.37 |
| L-6701 | 1.35 | 0.92 | 2.74 | 1.86 | — | — |
| LK-443[11] | — | — | — | — | 2.74 | 1.86 |
| lead naphthanate | 3.50 | 2.39 | 3.50 | 2.37 | 3.50 | 2.37 |
| sarcosine derivative | 5.00 | 3.42 | 5.00 | 3.39 | 5.00 | 3.39 |
| polycat-8 | 0.50 | 0.34 | 0.50 | 0.34 | 0.50 | 0.34 |
| water | 0.23 | 0.16 | 0.23 | 0.16 | 0.23 | 0.16 |
| HCFC-141b | 24.50 | 16.74 | 24.50 | 16.59 | 24.50 | 16.59 |

| | Polyol Formulation | | | | | |
|---|---|---|---|---|---|---|
| | 10 | | 11 | | 12 | |
| Component | pbw | % | pbw | % | pbw | % |
| PS 2352 | 72.6 | 49.15 | 72.6 | 49.68 | 72.6 | 49.78 |
| R-470X | 27.4 | 18.55 | 27.4 | 18.75 | 27.4 | 18.79 |
| AKZO PCF | 10.68 | 7.23 | 10.68 | 7.31 | 10.68 | 7.32 |
| Epoxy resin | 0.55 | 0.37 | 0.55 | 0.38 | 0.55 | 0.38 |
| L-6701 | — | — | 1.37 | 0.94 | 1.37 | 0.94 |
| LK-443 | 2.74 | 1.86 | — | — | — | — |
| lead naphthanate | 3.50 | 2.37 | 2.80 | 1.92 | 2.50 | 1.71 |
| sarcosine derivative | 5.00 | 3.39 | 5.00 | 3.42 | 5.00 | 3.43 |
| polycat-8 | 0.50 | 0.34 | 0.50 | 0.34 | 0.50 | 0.34 |
| water | 0.23 | 0.16 | 0.23 | 0.16 | .23 | 0.16 |
| HCFC-141b | 24.50 | 16.59 | 25.00 | 17.11 | 25.00 | 17.14 |

| | Polyol Formulation | | | | | |
|---|---|---|---|---|---|---|
| | 13 | | 14 | | 15 | |
| Component | pbw | % | pbw | % | pbw | % |
| PS 2352 | 72.6 | 49.96 | 72.6 | 49.68 | 72.6 | 49.55 |
| R-470X | 27.4 | 18.85 | 29.4 | 18.75 | 27.4 | 18.70 |
| AKZO PCF | 10.68 | 7.35 | 10.68 | 7.31 | 10.68 | 7.29 |
| Epoxy resin | 0.55 | 0.38 | 0.55 | 0.38 | 0.55 | 0.38 |
| L-6701 | 1.37 | 0.94 | 1.37 | 0.94 | 1.37 | 0.93 |
| lead naphthanate | 2.50 | 1.72 | 3.30 | 2.26 | 3.7 | 2.53 |
| sarcosine derivative | 5.00 | 3.44 | 5.00 | 3.42 | 5.00 | 3.41 |
| polycat-8 | 0.50 | 0.34 | 0.50 | 0.34 | 0.50 | 0.34 |
| water | 0.23 | 0.16 | 0.23 | 0.16 | 0.23 | 0.16 |
| HCFC-141b | 24.50 | 16.86 | 24.50 | 16.76 | 24.50 | 16.71 |

| | Polyol Formulation | | | | | |
|---|---|---|---|---|---|---|
| | 16 | | 17 | | 18 | |
| Component | pbw | % | pbw | % | pbw | % |
| PS 2352 | 72.6 | 48.94 | 72.6 | 49.83 | 72.6 | 48.68 |
| R-470X | 27.4 | 18.47 | 27.4 | 18.81 | 27.4 | 18.37 |
| AKZO PCF | 10.68 | 7.20 | 10.68 | 7.33 | 10.68 | 7.16 |
| Epoxy resin | 0.55 | 0.37 | 0.55 | .38 | 0.55 | 0.37 |
| L-6701 | 1.37 | 0.92 | 1.37 | .94 | 3.30 | 0.92 |
| lead naphthanate | 2.50 | 1.69 | 2.50 | 1.72 | 1.37 | 2.21 |
| sarcosine derivative | 5.0 | 3.37 | 5.00 | 3.43 | 3.30 | 3.35 |
| polycat-8 | 0.50 | 0.34 | 0.50 | 0.34 | 5.00 | 0.34 |
| water | 0.23 | 0.16 | .60 | 0.41 | 0.23 | 0.15 |
| HCFC-141b | 27.50 | 18.54 | 24.50 | 16.82 | 27.50 | 18.45 |

| | Polyol Formulation | |
|---|---|---|
| | 19 | 20 |
| Component | pbw | pbw |
| PS 2352 | 72.64 | 72.60 |
| R-470X | 27.37 | 27.40 |
| AKZO PCF | 10.67 | 10.68 |
| Epoxy resin | 0.55 | 0.55 |
| LK-443 | 1.37 | 1.37 |
| lead naphthanate | 0.48 | 0.48 |
| potassium octoate | 2.05 | 2.05 |
| polycat-8 | 0.96 | 0.96 |
| water | 0.23 | 0.23 |
| HCFC-141b | 20.53 | 23.50 |

[1]parts by weight.
[2]weight percent.
[3]Modified diethylene glycol phthalate polyester polyol having an Oh value of about 230–250, available from Stepan Company, Northfield, Illinois.
[4]Formaldehyde polymer with nonylphenol, reaction products with diethanolamine and propylene oxide, available from Texaco Chemical Co., Bellaire, Texas.
[5]Tri($\beta$-chloroisopropyl) phosphate, available from Akzo Chemical Inc, Chicago, Illinois.
[6]3,4-Epoxy cyclohexyl methyl-3,4-epoxy cyclohexyl carboxylate.
[7]Polyalkyleneoxidemethylsiloxane copolymer available from OSi Specialties, Danbury, Connecticut.
[8]Sodium N-(2-hydroxy-5-nonylphenyl) methyl sarcosinate (50% active).
[9]N,N-dimethylcyclohexyl amine, available from Air Products, Allentown, Pennsylvania.
[10]2,2-dichloro-2-fluoroethane.
[11]Non-silicone urethane foam surfactant available from Air Products, Allentown, Pennsylvania.

EXAMPLE 2

A rigid foam is prepared as follows: Formulation 14, which is prepared as described above, and methylene bis(phenylisocyanate) are dispensed into a Gusman H2 metering machine which then dispenses equal volumes of the polyisocyanate and the polyol mixture to a Gusmer Corp. GX-7 spray gun. The polyol mixture and polyisocyanate combine in the nozzle of the spray gun which applies the mixture to a metal surface. Two additional layers of the foam are applied. The foam is applied to the surface at a temperature of from about 115° to 130° F. The resulting rigid spray foam has the following characteristics.

| | |
|---|---|
| Flame spread | 20 |
| Smoke index | 640 |
| Closed Cell content | 97% |
| K-factor | 0.136 |
| Sprayed density (lbs/ft.$^3$) | 3.17 |
| Creep (in.) | 0 |
| Pinholes (No./in.$^2$) | 0 |
| percent volume loss after storage in 100% relative humidity at 158° C. | 6 |
| Compressive Strength (lbs/ft.$^3$) | 53.5 |
| Shear Strength (lbs/in.$^2$) | 34.5 |
| Tensile Strength (lbs/in.$^2$) | 62.8 |

EXAMPLE 3

Rigid foam is prepared essentially as described above for Formulation 14 but using Formulations 19 and 20. The resulting rigid spray foams have the following characteristics. foam has the following characteristics.

| | Foam Prepared Using Formulation No. | |
|---|---|---|
| | 19 | 20 |
| Flame Spread | 50.3 | 56 |
| Smoke Index | 849 | 643 |
| Closed Cell content | 95.8% | 96% |
| K-factor | 0.143 | 0.136 |
| Sprayed density (lbs/ft.$^3$) | 2.99 | 3.17 |
| Pinholes (No./in.$^2$) | NA[12] | 8 |
| Creep (in.) | NA | 2.0 |
| percent volume loss after | 6.3 | 9.2 |

-continued

| | Foam Prepared Using Formulation No. | |
|---|---|---|
| | 19 | 20 |
| storage in 100% relative humidity at 158° C. | | |
| Compressive Strength (lbs/ft.³) | 32.7 | 35.9 |
| Shear Strength (lbs/in.²) | NA | 25.96 |
| Tensile Strength (lbs/in.²) | NA | 34.26 |

[12]not available

EXAMPLE 4

Preparation of a Rigid Foam Using Water as the Blowing Agent

A polyol blend is prepared using 75 parts of a modified diethylene glycol phthalate polyester polyol having an OH value of from about 230-250 (sold by Stepan Company, Northfield, Ill., as PS 2502A), 25 parts of an alkoxylated glycerine polyether polyol having an OH value of from about 350-390 (sold by Stepan Company, Northfield, Ill., as PE 3603), 7 parts of water, 1.5 parts B-8404 (silicone surfactant available from Goldschmidt), 0.65 parts pentamethyl diethylene triamine (available from Air Products as Polycat 5), and 0.5 parts sodium N-(2-hydroxy-5-nonylphenyl)methyl sarcosinate. The polyol blend is added to the resin tank of a Cannon H-100 metering machine. The isocyanate storage tank contains methylene bis(phenylisocyanate). A shot of foam is dispensed at a NCO/OH index of about 115 into a paper cup or desired part and allowed to cure. The resulting foam has excellent compressive strength and adhesion characteristics with low foaming pressure.

From the foregoing, it will appreciated that although specific embodiments of the invention have been described herein for purposes of illustration, various modifications may be made without deviating from the spirit or scope of the invention.

What is claimed is:

1. A method for preparing a rigid foam having urea or urethane groups as the major recurring polymer unit comprising contacting a polyisocyanate with a polyol mixture comprising (a) from about 40-95% by weight of polyol selected from the group consisting of polyester polyols, polyether polyols, and mixtures thereof;
(b) a catalytic amount of a catalyst system comprising a primary catalyst and an amino acid salt derived from sarcosine; and
(c) a non-chlorofluorocarbon blowing agent.

2. A method according to claim 1, wherein the NCO-/OH index is less than about 249.

3. A method according to claim 1, wherein the polyisocyanate is methylene bis(phenylisocyanate).

4. A method according to claim 3, wherein the sarconsine derivative is selected from the group consisting of sodium N-(2-hydroxy-5-methylphenyl)methyl sarcosinate;
sodium N-(2-hydroxy-5-ethylphenyl)methyl sarcosinate;
sodium N-(2-hydroxy-5-butylphenyl)methyl sarcosinate;
sodium N-(2-hydroxy-5-heptylphenyl)methyl sarcosinate;
sodium N-(2-hydroxy-5-nonylphenyl)methyl sarcosinate;
sodium N-(2-hydroxy-5-dodecylphenyl)methyl sarcosinate;
potassium N-(2-hydroxy-5-nonylphenyl)methyl sarcosinate; and
lithium N-(2-hydroxy-5-nonylphenyl)methyl sarcosinate.

5. A method according to claim 4, wherein the polyol mixture comprises from about 45-80% by weight of a polyester polyol.

6. A method according to claim 5, wherein the polyol mixture comprises from about 45-55% by weight of a polyester polyol.

7. A method according to claim 6, wherein the polymer mixture further comprises a polyether polyol.

8. A method according to claim 6, wherein the polymer mixture comprises from about 40-80% by weight of a polyether polyol.

9. A method according to claim 6, wherein the polyol mixture comprises from about 0.1-5% by weight of the amino acid salt catalyst derived from sarcosine.

10. A method according to claim 6, wherein the polyol mixture comprises from about 0.75-2% by weight of the amino acid salt catalyst derived from sarcosine.

* * * * *